Dec. 9, 1969  G. H. GAYNOR  3,483,468
ANALOG-TO-DIGITAL VOLTAGE CONVERTER
Filed June 24, 1966  6 Sheets-Sheet 1
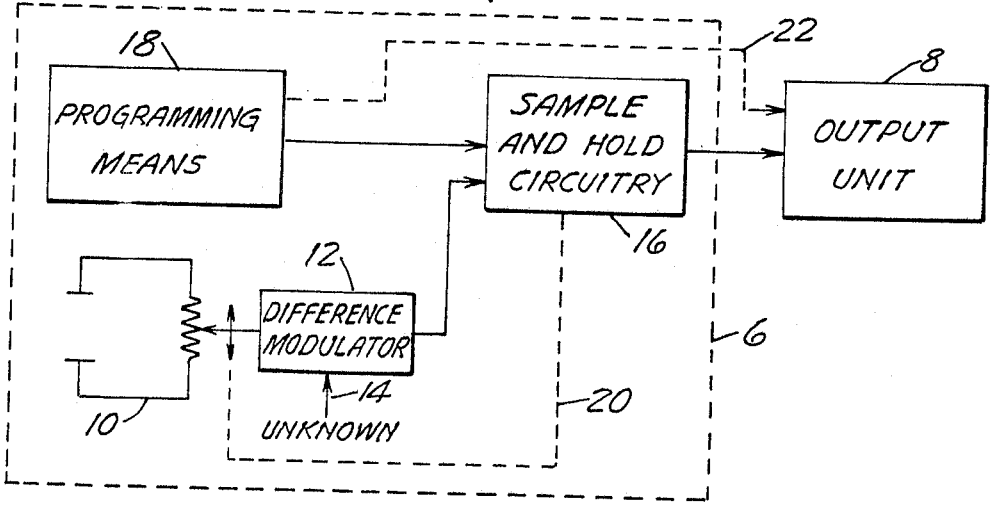
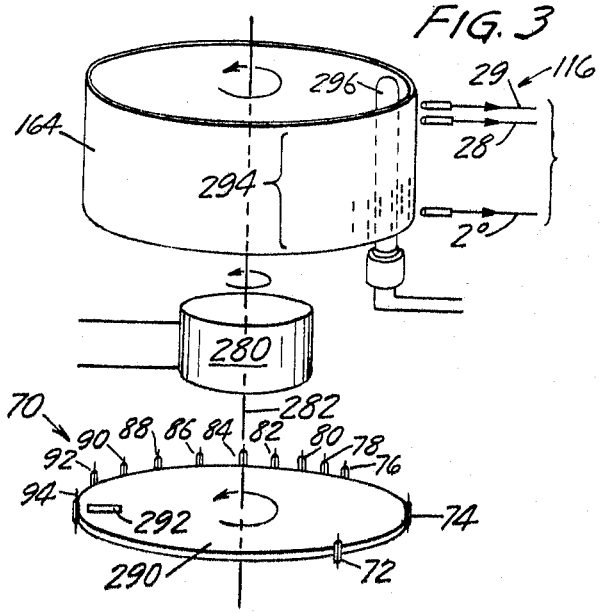
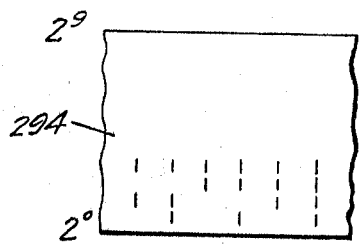
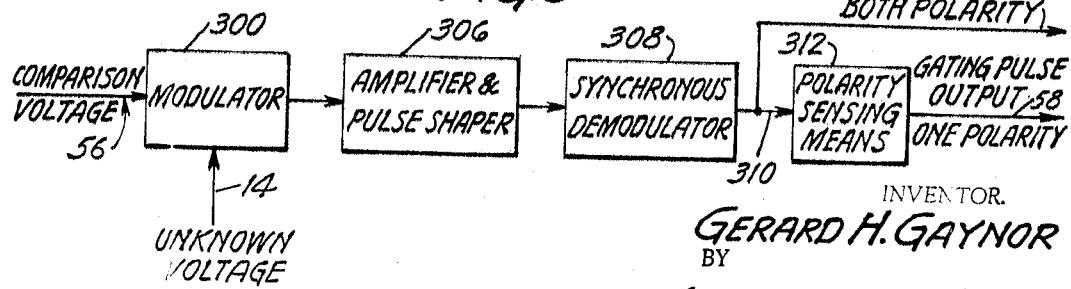
INVENTOR.
GERARD H. GAYNOR
BY
Carpenter, Kinney & Coulter
ATTORNEYS

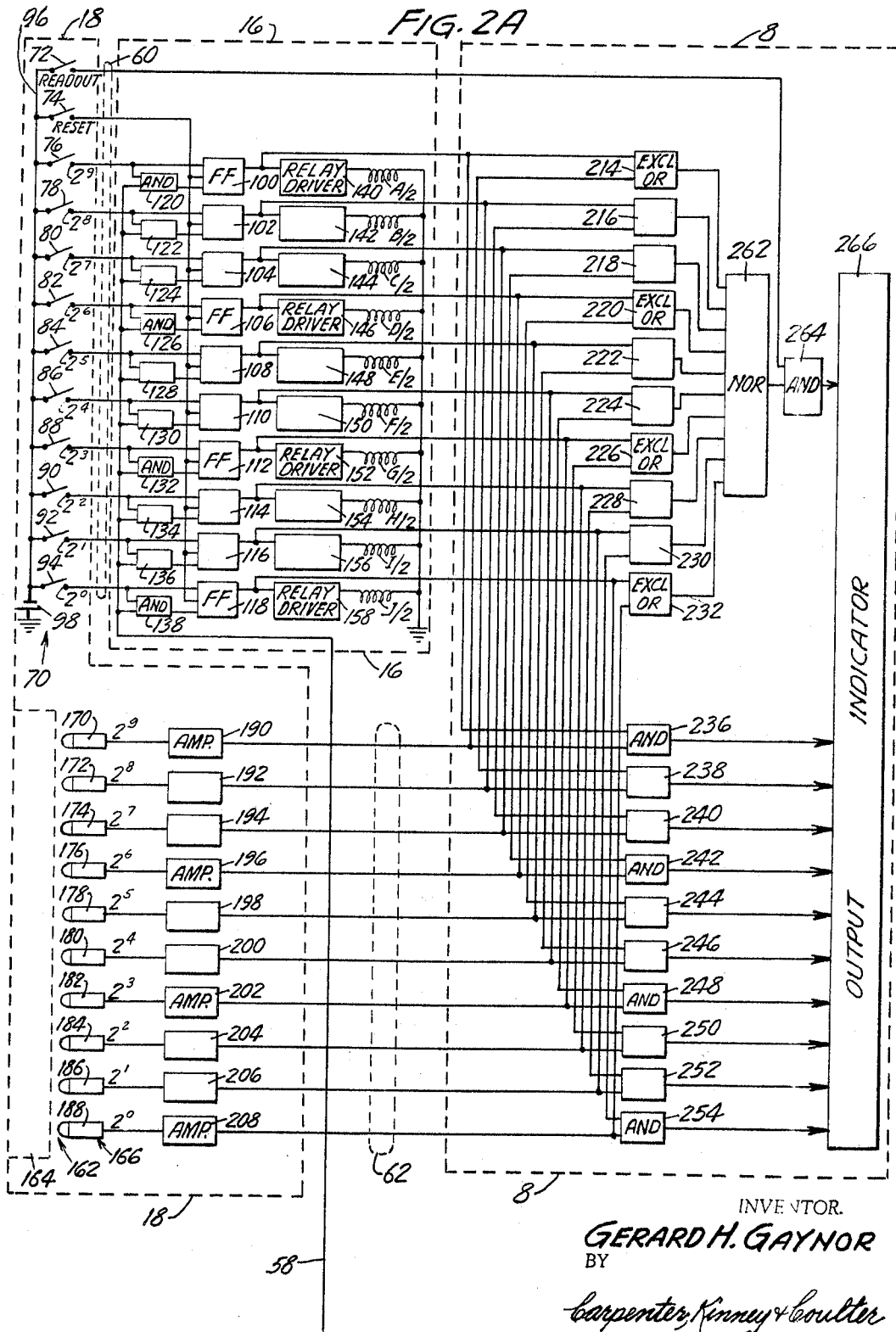

Dec. 9, 1969   G. H. GAYNOR   3,483,468
ANALOG-TO-DIGITAL VOLTAGE CONVERTER
Filed June 24, 1966   6 Sheets-Sheet 3

INVENTOR.
GERARD H. GAYNOR
BY
Carpenter, Kinney & Coulter
ATTORNEYS

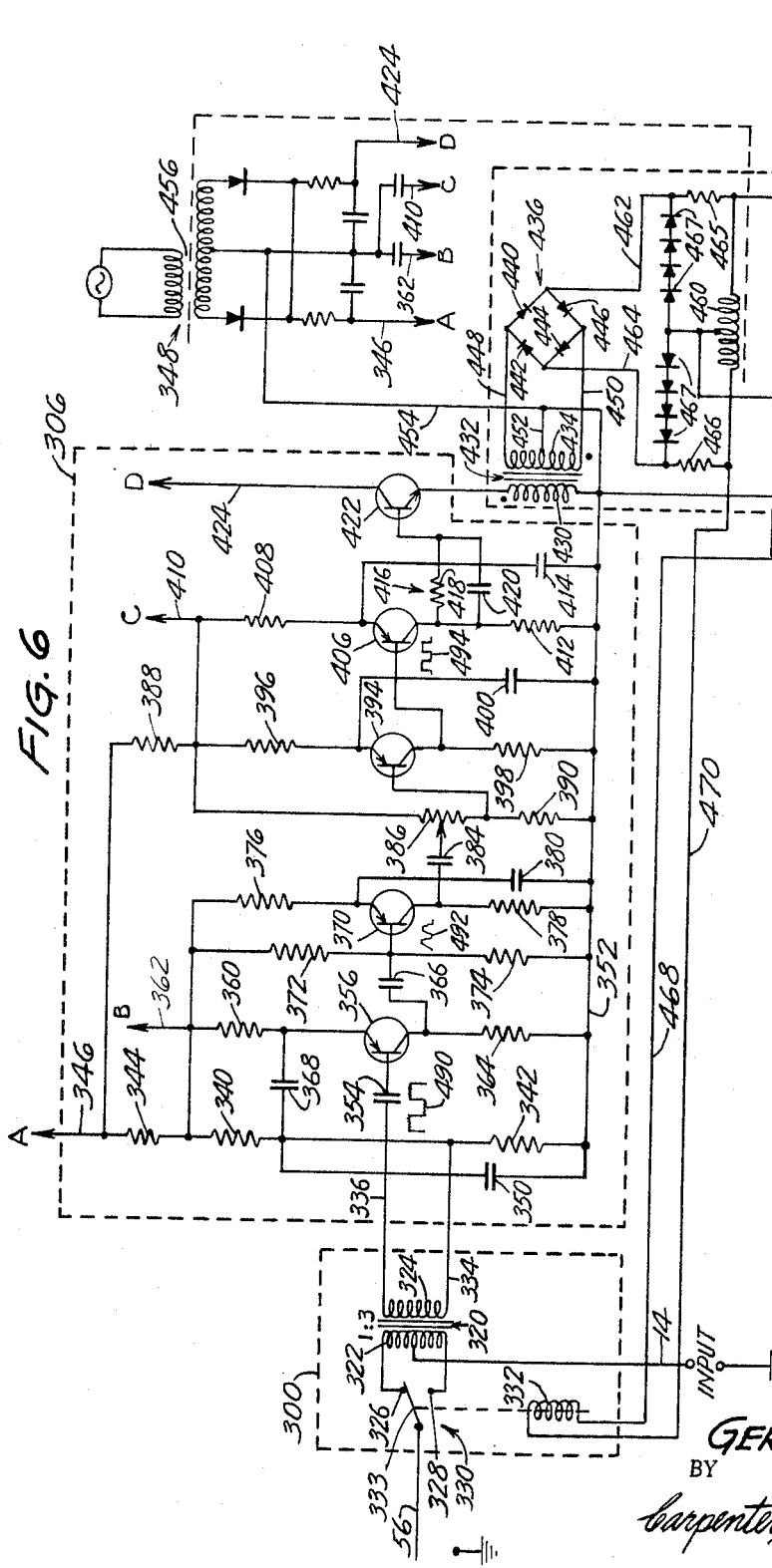

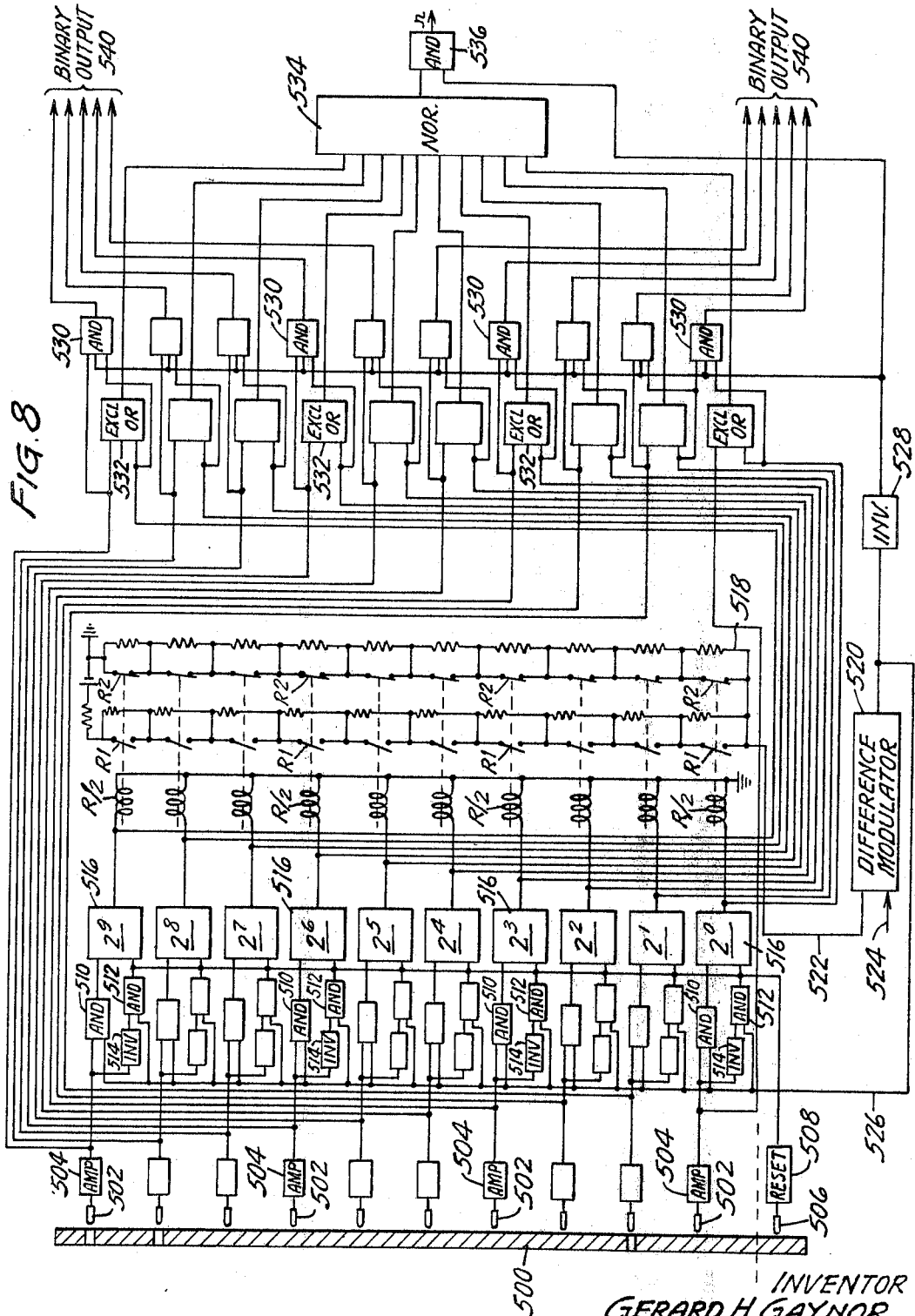

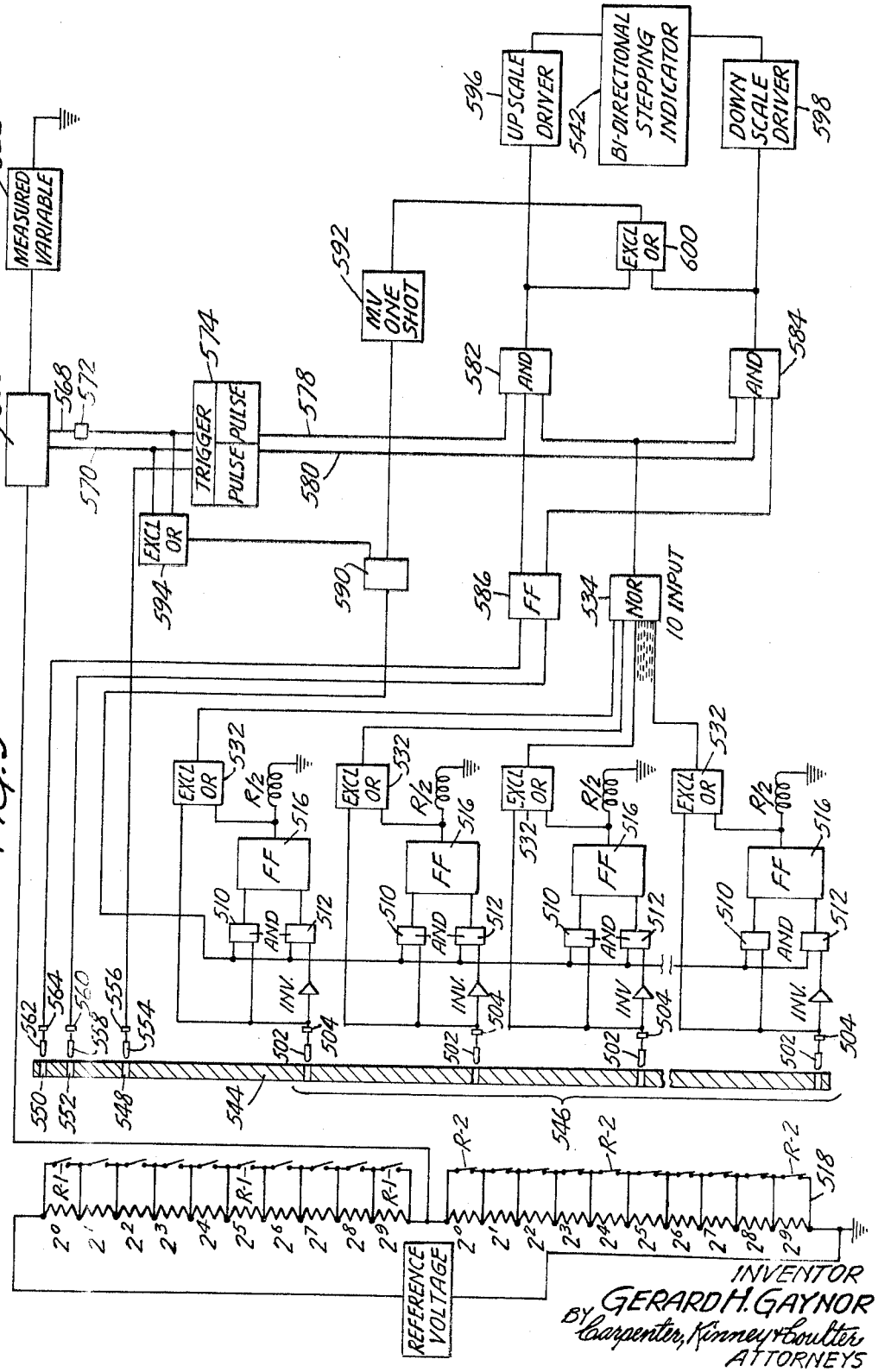

United States Patent Office 3,483,468
Patented Dec. 9, 1969

3,483,468
ANALOG-TO-DIGITAL VOLTAGE CONVERTER
Gerard H. Gaynor, Edina, Minn., assignor to Minnesota Mining and Manufacturing Company, St. Paul, Minn., a corporation of Delaware
Filed June 24, 1966, Ser. No. 560,172
Int. Cl. G01r 17/06; H04l 3/00
U.S. Cl. 324—99                                   13 Claims

ABSTRACT OF THE DISCLOSURE

A device for providing a binary-coded representation of an analog entity. A potentiometer provides a comparison voltage for comparison with an unknown analog voltage. The range of voltage values produced by the potentiometer defines a binary series and each voltage in the series is produced in response to a set of programming signals having a binary representation corresponding to the voltage value and thus corresponding to the unknown analog voltage when the comparison and unknown voltages are equal. In one embodiment, the potentiometer is bidirectionally stepped a unit at a time to follow changes in the unknown voltage.

---

This invention relates to a digital voltage measuring device and in one aspect to apparatus for converting an unknown analog voltage into a digital representation.

Digital voltmeters, voltage measuring apparatus and the like have been used for converting an unknown analog voltage into a digital representation. In such devices, a comparison system is employed wherein the unknown voltage is compared with one of several reference voltages. When the unknown voltage equals one of the reference voltages, the known digital representation of the reference voltage is used as the digital representation of the unknown voltage.

One such voltage measuring apparatus is described in Patent No. 3,052,845 to R. C. Bowes et al. This apparatus employs a comparison system which comprises a mechanical input chopper, a differential circuit, a stabilized linear amplifier and a gate pulse generator. The comparison system makes a comparison between an unknown voltage and a reference voltage for each digit beginning with the most significant digit. The reference voltage and the unknown input voltage are applied alternately by the input chopper to the differential circuit. If the particular reference voltage is greater than the unknown voltage, a sample and hold circuit bypasses the reference voltage. Conversely, if the particular reference voltage is greater than or equal to the unknown voltage, the sample and hold circuit retains the reference voltage. When the comparison for the least significant digit sequence is completed, the retained reference voltages additively are equal to the unknown voltage. A digital representation of the unknown voltage is produced by registering whether the comparison circuit bypasses or retains the reference voltage for each digit. The comparison system utilized by this voltage measuring apparatus is generally known as an intermittent comparison system.

Other known voltage measuring devices, for example, Patent No. 3,064,247 to Elliot R. Lang and Patent No. 3,149,282 to Phillip D. Wasseman, have employed a constant load potentiometer as a means for producing a plurality of comparison voltages. Comparison voltages and the unknown voltage are applied to a comparison system which determined which of the produced comparison voltages equalled the unknown voltage.

The Patent No. 3,064,247 requires a linear D.C. amplifier having stable gain characteristics for amplifying the unknown voltage. The amplified unknown voltage is applied as an unknown signal to a decision amplifier and a comparison voltage, from a constant load potentiometer, is applied to the decision amplifier as the known signal. The decision amplifier, a control circuit and a digital rebalancing circuit are connected in a closed loop arrangement. The digital rebalancing circuit, comprising twelve separate constant load potentiometers, makes continual adjustments in response to signals from the decision amplifier until a comparison voltage is produced which equals the amplified unknown voltage. This voltage measuring device utilizes a continual comparison system.

The Patent No. 3,149,282 requires a mechanical chopper for alternately applying the unknown voltage and a known voltage, from the constant load potentiometer, to the same input of a highly stabilized linear D.C. amplifier. The D.C. amplifier, a driver, a programming means, a plurality of decimal decade units and the constant load potentiometer form part of a closed loop. The driver, which determines the relationship between the magnitudes of the unknown voltage and the known voltage, conditions the programming means with appropriate control signals indicating the voltage relationship. The programming means responds to the control signals by programming the decimal decade units to adjust the constant load potentiometer such that a known voltage is produced which equals the unknown voltage. This particular voltage measuring device utilizes an intermittent comparison system.

The present invention provides a new and unique voltage measuring device which gives a digital representation of an unknown voltage. The digital voltage measuring device is a combination intermittent and continual comparison system. The unknown input voltage is continually applied to a difference modulator while the reference voltage is alternately applied to either one of two (or possibly more) other terminals of the same difference modulator. The difference modulator produces a modulated difference signal as an output.

Significantly, the new digital voltage measuring device of this invention is capable of operating directly on low voltage input signals, for example, a low voltage signal produced by a thermocouple. No amplification is required prior to modulation.

This digital voltage measuring apparatus employs a single known digital potentiometer, which may be for example a constant load potentiometer, and a known registering means, for example a sample and hold circuit or circuits. A significant new feature of the preferred embodiments of this invention is that a difference modulator in combination with a sample and hold circuit is used to control a constant load potentiometer for producing a comparison voltage equalling the unknown voltage. The condition of the sample and hold circuit (or means for those functions), when the reference voltage equals the unknown voltage, contains or holds the digital representation of the unknown voltage.

In this invention, it is possible to provide a digital voltage measuring device for converting an unknown voltage into a digital representation.

Using the teachings of this invention, it is possible to provide a digital voltage measuring device whose operation is independent of a stable, linear D.C. amplifier. It is also possible to provide a digital voltage measuring device responsive directly to low voltage signals from a transducer.

A further benefit of this invention is that it provides a new arrangement of elements for a digital voltage measuring device with simplified circuitry and economical construction.

The invention will be described by reference to a drawing, made a part hereof, wherein:

FIGURE 1 is a block diagram illustrating a digital voltage measuring device according to the present invention;

FIGURES 2A and 2B, in combination, are a diagrammatic representation, partially in a block diagram and partially in a schematic diagram, of a ten binary digit voltage measuring device wherein a programming means employs separate outputs for programming an analog-to-digital converter and an output unit;

FIGURE 3 is a diagrammatic representation illustrating suitable programming apparatus for the embodiment of FIGURE 2;

FIGURE 4 is a graphic representation of an encoded drum useful in the programming apparatus of FIGURE 3;

FIGURE 5 is a block diagram illustrating a difference modulator useful in practicing the present invention;

FIGURE 6 is a schematic diagram illustrating the difference modulator of FIGURE 5;

FIGURE 7 is a graph illustrating a voltage waveform of the circuit in FIGURE 6;

FIGURE 8 is another embodiment of the present invention wherein the programming means utilizes a single output to program the analog-to-digital converter and the output unit; and FIGURE 9 is yet another embodiment of the present invention wherein the output unit is a bidirectional stepping indicator.

Figure 2B:
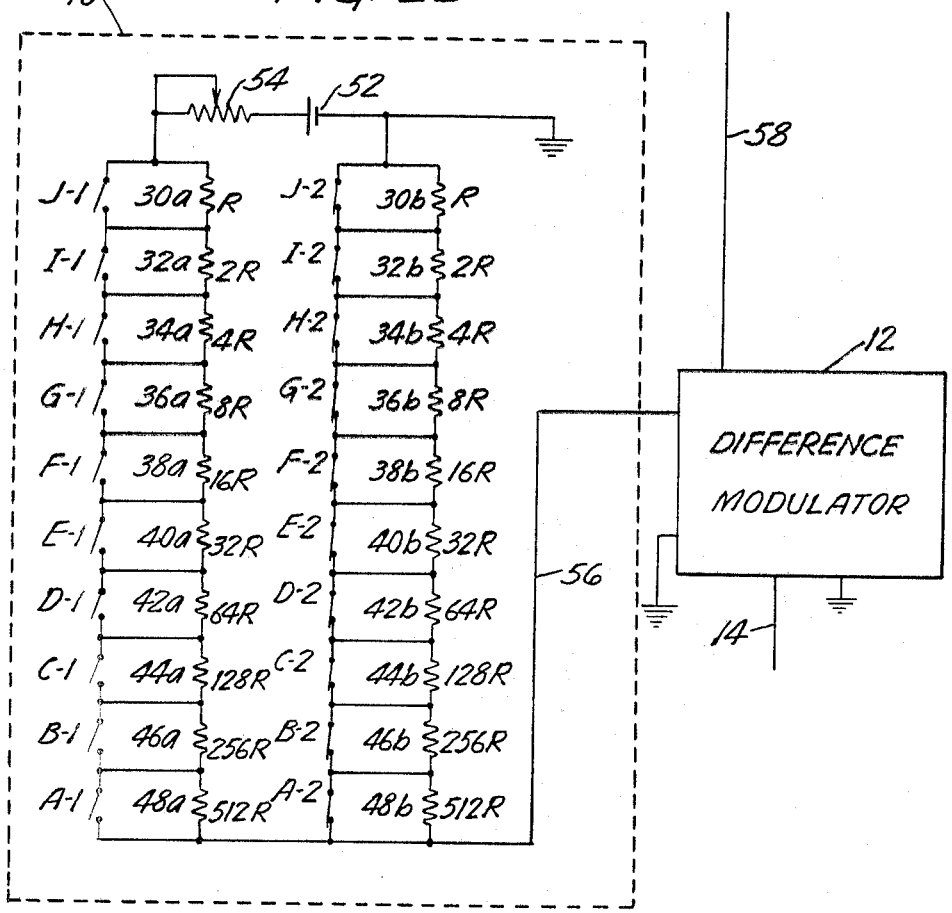

Briefly, the digital voltage measuring device is an analog-to-digital converter which converts an unknown analog signal into a digital representation. The digital voltage measuring device includes a digital potentiometer means for producing a sequence of comparison voltages. A difference means, coupled to the digital potentiometer means, is responsive to a comparison voltage and the unknown voltage to produce a modulated difference signal when the unknown voltage is unequal to the comparison voltage. The difference means includes means for amplifying the modulated difference signal and means for producing a gating signal in response to the amplified modulated difference signal. A registering means is electrically coupled to the difference means for controlling the digital potentiometer means. The digital potentiometer means is responsive to the registering means. The registering means is responsive to the gating signal to control which of the comparison voltages is produced by said digital potentiometer means. A programming means is operatively coupled to and actuates the registering means in accordance with a programmed sequence. The registering means is responsive to being actuated by the programming means for controlling the digital potentiometer means to produce the comparison voltage which essentially equals the unknown voltage.

Referring now to the block diagram of FIGURE 1, the digital voltage measuring device comprises an analog-to-digital converter 6 and an output unit 8. The analog-to-digital converter 6 includes a digital potentiometer means 10 for producing a sequence of comparison voltages. The digital potentiometer means 10 may be any known potentiometer means for producing comparison voltages in discrete integers on a digital scale. The digital potentiometer means 10 is electrically coupled to and applies comparison voltages to a difference modulator 12. Throughout the application, the terms electrically coupled, electrically connected and operatively coupled applies equally to a direct electrical connection between electrical components or to electrical connections between components via intermediate elements. The difference modulator 12 receives an unknown input voltage, which is to be converted into a digital representation, via input 14.

The difference modulator 12 is operatively connected to and conditions a registering means such as, for example, a sample and hold circuit 16 if the unknown voltage is unequal to a comparison voltage. A programming means 18, containing a stored program sequence, is also connected to the sample and hold circuit 16. The sample and hold circuit 16 is operatively coupled to the digital potentiometer means 10 via mechanical adjusting means 20 which adjusts the digital potentiometer means 10 in response to the sample and hold circuit 16. The sample and hold circuit 16 is connected to the output unit 8 for producing the digital representation of the unknown voltage as an output signal.

In operation, the difference modulator 12 receives a comparison voltage from the digital potentiometer means 10 and an unknown voltage via input 14. The difference modulator 12 produces a modulated difference signal and applies a gating signal to the sample and hold circuit 16 if the comparison voltage exceeds or is less than the unknown voltage. Concomitantly, the programming means 18 programs operation of the sample and hold circuit 16 in accordance with the stored programmed sequence. When the sample and hold circuit 16 is simultaneously conditioned by a gating signal from the difference modulator 12 and the programming means 18, the sample and hold circuit 16 adjusts the digital potentiometer means 10 via mechanical adjusting means 20. When the digital potentiometer means 10 is adjusted to produce a comparison voltage which equals the unknown voltage, the difference modulator 12 terminates the gating signal being applied to the sample and hold circuit 16. Alternately, the difference modulator 12, upon detecting that a comparison voltage equals the unknown voltage, may additionally apply a balance signal via line 22 to the output unit 8. In either embodiment, the sample and hold circuit 16 is disabled preventing further adjustments of digital potentiometer means 10 via the mechanical adjusting means 20 until a new or additional measurement of the unknown voltage is required. The output unit 8 may produce the digital representation of the unknown voltage in any one of a variety of formats, for example, as a visual representation using known nixie readout tubes and the like, or as a binary signal for input to digital computer.

FIGURES 2A and 2B, in combination, illustrate one embodiment of the analog-to-digital converter 6 and the output unit 8. The elements illustrated as blocks in FIGURE 1 are illustrated as dashed outlines in FIGURES 2A and 2B and are identified by the same numbers.

The digital potentiometer means 10 comprises, for example, a constant load digital potentiometer wherein the total resistance connected into the potentiometer circuit at any time is constant. The constant load digital potentiometer 10 may include two sections each having ten series connected resistors designated 30a, 30b through 48a, 48b. Each of the resistors having the same numbers are of the same ohmic value but resistors of different numbers have different ohmic values, which values are graded according to a binary code. For example, resistors 30a, 30b are R ohms, resistors 32a, 32b are 2R ohms, etc. through to resistors 48a, 48b which are, illustratively, 512R ohms. In a typical embodiment, R may be one. Thus, each resistor would have an ohmic value proportional to its binary representation.

Each of the resistors 30a through 48a are shunted by normally open contacts identified J1 through A1, respectively. Similarly, each of the resistors 30b through 48b are shunted by normally closed contacts identified J2 through A2, respectively. The two sections are connected in series circuit relation with resistor 48b connected to resistor 48a. A reed relay having reed switches and relay actuating coils may be used in the potentiometer 10 wherein the relay switches are used for the contacts and the coils are controlled by the sample and hold circuit 16.

Typical reed relays which may be used in this embodiment include a 12 volt, 350 ohm, 400 milliwatt coil which encloses the reed switches. The reed switches comprise two separate, glass enclosed, magnetic responsive, form A switches each having rhodium contacts rated at 3 watts capacity and having a biasing magnet to cause one of the form A switches to be a form B switch.

Each of the A1 and A2 through J1 and J2 contacts are ganged to operate simultaneously. For example, when normally open contact A1 is closed, normally closed contact A2 is opened. Thus, when any pair of contacts are operated simultaneously, the resistance of the resistor-contact matrix remains constant such that any potential applied across the matrix remains constant.

A source of D.C. potential 52, for example, a battery, is connected in series with a potentiometer 54 with a very low potential, e.g. about 10 millivolts, across the series connected resistors. A conductor 56, connected between the resistors 48a and 48b, electrically connects the digital potentiometer means 10 to the difference modulator 12. As the various combinations of the pairs of contacts are selectively operated, a sequence of comparison voltages are applied, via conductor 56, as the known signal to the difference modulator. The voltage applied to conductor 56 prior to a comparison cycle is zero. However, the voltage applied to conductor 56 can selectively be raised in a binary sequence to the maximum voltage applied to the potentiometer 10 during a comparison cycle by selectively switching the various resistors 30a through 48a and 30b through 48b into and out of the circuit.

The unknown input voltage is applied to the difference modulator 12 via input 14. The difference modulator 12 produces a modulated difference signal, the amplitude thereof being either a level which varies in proportion to the differences between the voltages when the comparison voltage is unequal to the unknown voltage or a substantially zero level when the comparison voltage equals the unknown voltage. In this embodiment, the difference modulator 12 produces a gating signal only when the comparison voltage is greater than the unknown voltage. This gating signal is applied via a conductor 58 to the sample and hold circuit 16.

The sample and hold circuit 16 is operatively coupled to and controlled by the programming means 18. In this embodiment, the programming means 18 is capable of producing two separate sets of electrical output signals 60 and 62 in a programmed sequence. The first group of electrical signals 60 are applied in a serial format to the sample and hold circuit 16. The second group of electrical signals 62 are applied in a parallel format to the output unit 8.

The first group of electrical signals 60 are produced by a controller designated generally as 70 which comprises a plurality of reed switches 72 through 94 having first and second terminals, the first terminal thereof being electrically connected together by a common bus 96. These reed switches may, for example, be miniaturized, glass enclosed, magnetic responsive, mercury wetted, form A switches having a 28 watt capability. The common bus 96 is connected to a D.C. potential, for example a battery 98. Thus, when any of the reed switches 72 through 94 are selectively closed and opened (known as pulsing), a pulse in the form of a square wave is produced, which pulse is one of the electrical signals provided by output 60.

Reed switch 72 is designated as the "readout" switch and produces a readout pulse to condition the output unit 8 at the end of a comparison cycle. The readout pulse is produced by the controller 70 at the end of a comparison cycle and the readout pulse provides the means of controlling the timing of when the digital representation of the unknown voltage should be produced as an output.

Reed switch 74 is designated as the "reset" switch and produces a reset pulse to reset the sample and hold circuit 16 at the end of a comparison cycle. The reset pulse is produced by the controller 70 after the readout pulse and the reset pulse functions to reset the sample and hold circuit 16 whereby a new comparison cycle can be initiated.

Reed switches 76 through 94 are designated as the binary digit level switches from $2^9$ to $2^0$ respectively and each produce a "set" pulse to set various binary digit level circuitry with the sample and hold circuit 16. The set pulses are produced in sequence by the controller 70 and the set pulses function to control the sample and hold circuit 16 during each comparison sequence such that the sequence of comparison voltages are produced and applied to the difference modulator 12.

Thus, the first group of electrical signals 60 conditions various binary digit levels of circuitry within the sample and hold circuit 16 in accordance with the sequence of the various pulses. Each level represents a binary digit. In this embodiment, the most significant digit is $2^9$ and the least significant digit is $2^0$.

Each binary digit level circuit includes: a bistable device or flip flop, having a set and reset state, designated as 100 for $2^9$ level through 118 for the $2^0$ level; an AND gate designated as 120 for the $2^9$ level through 138 for $2^0$ level; a relay driver designated as 140 for the $2^9$ level through 158 for $2^0$ level; and relay actuating coil designated as A/2 for the $2^9$ level through J/2 for the $2^0$ level.

The flip flops 100 through 118 may comprise known transistorized devices having a set and reset time in the order of 10 microseconds. The relay actuating coils are identified by the same letter as the corresponding normally open contact and normally closed contact located within the digital potentiometer means 10. The number associated with the letter identifying each relay actuating coil is the total number of contacts actuated by the relay coil. For example, relay actuating coil A/2, identifying the $2^9$ level circuit, when energized simultaneously closes normally open contact A1 and opens normally closed contact A2, which contacts are located in the digital potentiometer means 10. In this embodiment, a relay actuating coil and its associated relay contacts are assembled into a unit known as a reed relay. However, in some applications, a reed relay may contain several relay actuating coils for each relay contact.

Each flip flop 100 through 118 has a set and a reset input with the set input thereof being connected to its respective reed switches 76 through 94. Thus, each flip flop 100 through 118 can be sequentially set by the set pulse from its respective reed switches 76 through 94. For example, when reed switch 76 is pulsed, the produced pulse sets flip flop 100.

When any flip flop 100 through 118 is set, the output from the set flip flop causes its respective relay driver 140 through 158 to energize its respective relay actuating coil A/2 through J/2 respectively. When any relay actuating coil A/2 through J/2 is energized, the normally open contacts A1 through J1 and the normally closed contacts A2 through J2 are simultaneously operated within the digital potentiometer means 10. Thus, for example, if the flip flop 100 is set, relay driver 140 causes relay actuating coil A/2 to be energized. When relay actuating coil A/2 is energized, normally open contact A1 is closed and normally closed contact A2 is opened within the digital potentiometer means 10. When this occurs, a comparison voltage is produced and applied via conductor 56 to the difference modulator 12.

Each of the AND gates 120 through 138 are connected to the reset inputs of flip flops 100 through 118 respectively. Each AND gate 120 through 138 has two inputs, the first input being connected to the reed switches 76 through 94 respectively and the second inputs being connected to the conductor 58 to receive a gating signal from the difference modulator 12. When any of the AND gates are simultaneously conditioned by a set pulse from its respective reed switch and a gating signal from the difference modulator, that AND gate resets its associated flip flop. The flip flop when reset de-energizes its associated relay driver, which driver de-energizes its associated relay actuating coil.

The outputs from flip flops 100 through 118, in addition to energizing relay drivers 140 through 158, are connected to the output unit 8.

Referring again to the programming means 18, the second group of electrical signals 62 are produced by a memory means, designated as 162. The memory means 162 includes a storage means, represented as dashed line 164, for storing a plurality of digital representations. One of the stored digital representations is equal to the digital representation of the unknown voltage. The storage means 164 may be any known storing means such as a magnetic drum, an encoded drum and the like.

The memory means 162 includes transducing means 166 which may be magnetic heads if the storage means 164 is a magnetic drum or photosensitive devices if the storage means is an encoded drum, or any other transducer which is capable of converting stored information into electrical signals. For purpose of example, the storage means 164 may be considered an encoded drum and the transducing means 166 may be considered photodiodes or the like.

Each binary digit would have a photodiode, designated as 170 for the $2^9$ digit through 188 for the $2^0$ digit, connected to an amplifier designated as 190 for the $2^9$ digit through 208 for the $2^0$ digit. The outputs from the amplifiers, the second group of electrical signals 62, would be the digital representations of the stored information on the encoded drum picked up by the photodiodes 170 through 188.

The output unit 8 includes several stages of circuitry, two of which include circuitry corresponding to each of the ten binary digit levels. The first stage of circuitry comprises a plurality of EXCLUSIVE OR (EXCL OR) gates designated as 214 for the $2^9$ level through 232 for the $2^0$ level. The second stage of circuitry comprises a plurality of AND gates designated as 236 for the $2^9$ level to 254 for the $2^0$ level. The first and second stages of circuitry are responsive to both the outputs from the flip flops 100 through 118 and to the second group of electrical signal outputs 62 from the programming means 18.

Each EXCL OR gate 214 through 232 applies its output to a NOR gate 262. NOR gate 262 applies its output to one input of AND gate 264. The other input to AND gate 264 is from the reed switch 72. The output of AND gate 264 is connected to an output indicator 266. When a readout pulse from readout switch 72 and a balance signal from NOR gate 262 are simultaneously applied to each input of AND gate 264, the AND gate 264 produces an output pulse. The output pulse is applied to the output indicator 266. When the output indicator 266 receives the output pulse, the flip flops 100 through 118, of the sample and hold circuit 16, contain the digital representation of the unknown voltage.

AND gates 236 through 254 have two inputs. The first inputs are directly coupled to amplifiers 190 through 208 to receive the second group of electrical signals 62 representing the plurality of digital representations. The second inputs are connected to the outputs of flip flops 100 through 118. At some time in the cycle, the first and second inputs will contain identical signals, which signals simultaneously condition AND gates 236 through 254 producing a digital representation of the unknown voltage. The digital representation, in this embodiment, is applied to the output indicator 266. The output indicator 266 may produce the digital representation in any one of a variety of formats.

In operation, the unknown voltage is applied to input 14 of the difference modulator 12. Flip flops 100 through 118 are in the reset state. Digital potentiometer means 10 has normally opened contacts A1 through J1 opened and normally closed contacts A2 through J2 closed.

In the following description, a comparison cycle comprises a comparison sequence for each binary digit, $2^9$ through $2^0$, a readout sequence and a reset sequence. During each comparison cycle, a digital representation of the unknown voltage is produced by the sample and hold circuit 16 adjusting the digital potentiometer means 10 to produce a comparison voltage which equals the unknown voltage.

The controller 70 begins the comparison cycle by pulsing reed switch 76, which reed switch remains closed for a sufficient period of time to make the $2^9$ comparison sequence. The reed switch 76, upon closure, causes flip flop 100 to set and conditions one input of AND gate 120. Flip flop 100, upon setting, applies an output signal to relay driver 140 energizing relay actuating coil A/2. Normally closed contact A2 is opened connecting resistor 48b into the circuit and normally opened contact A1 is closed bypassing resistor 48a from the circuit. Thus, the voltage appearing on conductor 56 is raised from a zero voltage to one-half of the voltage appearing across the series connected resistors 30a through 48a before the resistor 48a was bypassed. The one-half voltage is applied via conductor 56 as a comparison voltage to the difference modulator 12.

For purpose of example, assume that the comparison voltage exceeds the unknown voltage. The difference modulator 12 produces a modulated difference signal having a phase relationship which indicates the voltage relationship. In this embodiment, the difference modulator 12 produces a gating signal *only* when the phase relationship of the modulated difference signal indicates that the comparison voltage exceeds the unknown voltage.

The difference modulator 12 applies the gating signal, via conductor 58, to the second inputs of all the AND gates, including AND gate 120. AND gate 120, being simultaneously conditioned by the pulse from reed switch 76 and the gating signal from the difference modulator 12, produces a reset signal which resets flip flop 100. Flip flop 100, upon being reset, terminates its output signal causing relay driver 140 to de-energize relay actuating coil A/2. Normally opened contact A1 opens connecting resistor 48a back into the circuit and normally closed contact A2 closes shunting resistor 48b out of the circuit. The voltage on conductor 56 returns to zero. Thereafter, the reed switch 76 opens terminating the pulse being applied to flip flop 100 and AND gate 120.

The controller 70 then commences the $2^8$ comparison sequence. Reed switch 78 is closed setting flip flop 102 and conditioning one input and AND gate 122. Flip flop 102, upon setting, causes relay driver 142 to energize relay actuating coil B/2. Normally opened contact B1 is closed bypassing resistor 46a from the circuit and normally closed contact B2 is opened connecting resistor 46a into the circuit. Since only resistor 46a is connected in the circuit, the voltage on conductor 56 is raised from zero to one-quarter of the voltage appearing across resistors 30a through 48a before resistor 46a was shunted. The one-quarter voltage is applied, by conductor 56, as the comparison voltage to the difference modulator 12.

For purpose of example, assume that the unknown voltage exceeds the comparison voltage. The difference modulator 12 produces a modulated difference signal and the phase relationship of the signal would indicate the voltage relationship. Since the unknown voltage is greater than the comparison voltage, this would indicate that a comparison voltage lying between one-quarter and one-half of the initial voltage is equal to the unknown voltage. Further, the difference modulator 12 does *not* produce a gating signal. Flip flop 102 remains set and continues to apply an output signal to relay driver 142 keeping relay actuating coil B/2 energized. The reed switch 78 opens terminating the $2^8$ comparison sequence.

At the end of the $2^8$ comparison sequence, the flip flop 102, since remaining set, applies its output signal to one input of the EXCL OR gate 214 and one input of the AND gate 236. Further, since relay actuating coil B/2 remains energized, the normally opened contact B1 remains closed and the normally closed contact B2 remains open. Thus, the voltage appearing on conductor 56 at the end of the $2^8$ comparison sequence is one-quarter of the initial voltage.

The controller 70 then continues a similar comparison sequence for each digit. At the end of the $2^0$ comparison sequence, each flip flop 100 through 118 will either be in a set or reset state and the comparison voltage appearing on the conductor 56 will be equal to the unknown voltage. The states of the various flip flops 100 through 118, in combination, contain the digital representation of the unknown voltage. The digital representation is present at both the EXCL OR gates 214 through 232 and the AND gates 236 through 254, and this digital representation is read out by the following readout sequence.

The memory means 162 produces, in sequence, a plurality of digital representations. In this embodiment, there are 1023 possible decimal numeric combinations of the ten binary digits. Each of the digital representations are produced as electrical output signals 62. At one point in the sequence, one of the digital representations produced equals the digital representation of the unknown voltage represented by the states of the flip flops 100 through 118. When this occurs, each of the EXCL OR gates 214 through 232 are conditioned by like signals.

For example, when a flip flop is set, its output signal could be considered a "1," and when reset its output signal could be considered a "0." When the memory means 162 produces an electrical signal indicative of a stored binary one, this could be considered as a "1." Similarly, a stored binary zero could be considered as a "0." Further, the memory means 162 produces the appropriate signal for each binary digit in a parallel format.

Using the above notation, flip flop 100 is in its reset state and applies a "0" to EXCL OR gate 214 and a "0" to AND gate 236. Flip flop 102 is in its set state and applies a "1" to EXCL OR gate 216 and a "1" to AND gate 238. Each of the other flip flops conditions its respective EXCL OR gate and AND gate with appropriate signals.

When memory means 162 produces a digital signal equal to the digital representation stored in the flip flops, EXCL OR gate 214 and AND gate 236 each receive a "0" from amplifier 190. EXCL OR gate 214, since conditioned by a "0" on both inputs, applies a "0" to the NOR fate 262. Conversely, AND gate 236, since conditioned by a "0" on both inputs, produces a "0" on its output indicating that the $2^9$ digit of the digital representation of the unknown voltage is a "0."

Concurrently, EXCL OR gate 216 and AND gate 238 receive a "1" from amplifier 192. EXCL OR gate 216, since conditioned by a "1" on both inputs, would apply a "0" to the NOR gate 262. Similarly, AND gate 238, since conditioned by a "1" on both inputs produces a "1" on its output indicating that the $2^8$ digit of the digital representation of the unknown voltage is a "1."

A similar analysis can be made for the remaining $2^7$ through $2^0$ digits. In each case, the EXCL OR gates 218 through 232 apply a "0" to the NOR gate 262. However, the AND gates 240 through 254 produce a "1" output only when both inputs are "1." The outputs from AND gates 236 through 254 are applied to the output indicator 266 for display.

The NOR gate 262, since all its inputs are "0," applies a "1" output to AND gate 264. AND gate 264, when conditioned by closure of reed switch 72 during the readout sequence, applies a "1" output signal to the output indicator 266. This output signal is used to trigger the output indicator to display the binary signal from AND gates 236 through 254.

It is to be understood that the output unit 8 described above may employ any one of many known readout devices for displaying the digital representation of the unknown voltage.

After the readout sequence is completed, reed switch 74 is closed by controller 70 and resets all of the flip flops 100 through 118 terminating the comparison cycle. Thereafter a new comparison cycle is initiated by pulsing of reed switch 76.

FIGURE 3 is a diagrammatic illustration of an apparatus which may be used for the programming means 18 including a controller 70 and an encoded drum 164 as the storage means. The controller 70 and the encoded drum 164 are mechanically coupled to a drive motor 280. The controller 70 is coupled to motor 280 through a 3:1 gear reduction, illustrated by dashed line 282. Thus, for each revolution of the controller 70, the encoded drum 164 rotates through three revolutions. Such an arrangement permits the digital representation of the unknown voltage to be applied to the EXCL OR gates and the AND gates of the output unit at a rate of three times for each one comparison cycle. In this embodiment, the digital representation of the unknown signal will positively be produced at least once during a comparison cycle.

Controller 70 may comprise a disk 290 of a rigid material having a single magnet 292 disposed at the edge thereof and radially aligned with the center of disk 290. The reed switches 72 through 94 are disposed in a circular path around and adjacent the edge of the disk 290. The reed switches 76 through 94, corresponding to the $2^9$ through $2^0$ binary digit switches, are grouped within a 120° sector of the circular path. Reed switch 72, which is the readout switch, is disposed about 120° from the reed switch 94. Reed switch 74, which is the reset switch, is disposed about 60° from the reed switch 72.

The magnet 292 is rotated counterclockwise by the disk 290 past each of the reed switches. As the magnet 292 is rotated past each reed switch, each switch is momentarily closed or pulsed. Since the relationship between the magnet 292 and the reed switches 72 through 94 are fixed, the closing sequences of the switches are fixed. Thus, each comparison cycle has reed switches 76 through 94, the $2^9$ through $2^0$ comparison sequence, closed in sequence. Thereafter, reed switch 72, the readout sequence, and reed switch 74, the reset sequence, are closed in order.

The encoded drum 164 has a surface periphery of varying optical densities. The varying optical densities may be transparent or opaque areas which represent binary coded digits in the form of a plurality of digital representations. In this embodiment, the transparent or opaque areas of varying optical densities are a plurality of slits 294 on the peripheral surface of the drum 164. The slits 294 are arranged in a predetermined pattern such that axially aligned slits represent a digital number. A light source 296 is disposed adjacent the inner side of the peripheral surface of the drum and in axial alignment with the drum 164 and slits 294. The transducing means 166, comprising photodiodes 170 through 188, are disposed adjacent the outer surface of the drum 164 in opposed aligned relationship with the light source 296 such that the encoded drum 164 permits light from the light source 296 to impinge upon the photodiodes 170 through 188 when slits 294 are in alignment therebetween.

FIGURE 4 is a diagrammatic illustration of a fragmentary peripheral surface section of the encoded drum 164 illustrating digital representations of decimal digits 10 through 15 in the form of binary bits wherein a slit 294 (a transparent area) represents a binary one and a solid area (an opaque area), or the absence of a slit, represents a binary zero.

The block diagram of FIGURE 5 represents components of a difference modulator 12 which may be used in the various embodiments of this invention. The comparison voltage from the digital potentiometer means 10 of FIGURE 2 is applied to a modulator 300 via conductor 56 and the unknown voltage, to be converted into its digital representation, is applied to modulator 300 via input 14. Modulator 300 produces a modulated difference signal if the comparison voltage is unequal to the unknown voltage. The modulated difference signal is applied to an amplifier and pulse shaper 306 where the modulated difference signal is amplified and the resultant pulses shaped into a square wave pulse. The square wave pulse, produced by the amplifier and pulse shaper 306, is applied to a demodulator 308 where the amplified modulated difference signal is demodulated to produce a gating signal. The gating signal is produced on output 310 and may have a negative or positive polarity, depending upon whether the comparison voltage exceeds or is less than the unknown voltage, respectively. The demodulator 308 applies the gating signal via output 310 to a polarity sensing means 312. The polarity sensing means 312 produces a selected gating signal having a negative polarity on conductor 58 only when the comparison voltage is greater than the unknown voltage.

Considering now the schematic diagram of FIGURE 6, the components illustrated in the blocks of FIGURE 5 are shown as dashed lines in FIGURE 6 and are identified by the same numerals. The modulator 300 includes an input transformer 320 having a primary winding 322 and a secondary winding 324. Primary winding 322 has a center tap 323 and input 14 is connected to primary winding 322 at tap 323. Input transformer 320 is a step-up transformer having a winding ratio of about 1:3. Both the primary and secondary windings are shielded to minimize stray electrical fields and to lesson interwinding capacitance. In this embodiment, the input voltage may be in the range of about 0 to 10 millivolts. However, it is to be understood that any range of voltage and an appropriate input transformer may be used.

Each end of primary winding 322 terminates at fixed contacts 326 and 328 of a synchronous mechanical chopper 330. The chopper 330 has a driving coil 332 which drives a movable contact 333 at a fixed frequency. The chopper 330 may be a conventional mechanical chopper having a 6 volt, 60 cycle A.C. coil and a synchronous 60 cycle mechanical movement having contacts which make before break.

The comparison voltage from the digital potentiometer means 10 is applied via conductor 56 to the movable contact 333. Movable contact 333 alternately applies the comparison voltage via fixed contacts 326 and 328 to primary winding 322. However, primary winding 322 has the unknown voltage continually applied thereto via input 14 at center tap 323. Thus, the resultant voltage appearing across primary winding 322, when the movable contact 333 engages either fixed contact 326 and 328, is the difference between the comparison voltage and the unknown voltage. Additionally, this difference voltage will be modulated at a 60 cycle rate due to the synchronous movement of the chopper 330. The driving coil 332 is energized by a voltage from the demodulator 308.

The secondary winding 324 of transformer 320 applies the stepped-up modulated difference signal appearing between leads 334 and 336 as an input to the amplifier and pulse shaper 306. The amplifier and pulse shaper circuit 306 includes voltage dividing resistors 340, 342 and 344 as the input portion thereof. The voltage dividing resistor 344 is coupled via lead 346 to a D.C. power supply 348.

Lead 334 connects one side of secondary winding 324 between voltage dividing resistors 340 and 342. The voltage appearing across resistor 342 biases the operating level of secondary winding 324 such that any voltage appearing there-across is either algebraically added to or subtracted from the voltage across resistor 342.

A filter capacitor 350 is connected between a ground conductor 352 and resistors 340 and 342 for conducting undesired A.C. signals to ground.

Lead 336, connected to the other side of secondary winding 324, is connected via a coupling capacitor 354 to the base of a PNP transistor 356. The emitter of transistor 356 is coupled through an emitter resistor 360 and lead 362 to the power supply 348. The collector of transistor 356 is connected via collector resistor 364 to ground conductor 352. The collector or transistor 356 is coupled through a coupling capacitor 366 to the base of a PNP transistor 370. An emitter bypass capacitor 368 conducts A.C. signals on the emitter of transistor 356 to ground conductor 352 via capacitor 350.

Base biasing resistors 372 and 374 are connected via lead 362 to the power supply 348 to establish an operating potential for transistor 370. The emitter of transistor 370 is connected through an emitter resistor 376 and lead 362 to the power supply 348. The collector of transistor 370 is connected via a collector resistor 378 to the ground conductor 352.

An emitter bypass capacitor 380 is connected between the emitter of transistor 370 and ground conductor 352 for conducting A.C. signals to ground. The collector of transistor 370 is connected via a coupling capacitor 384 to a potentiometer 386. The potentiometer 386 is connected to the power supply 348 via a voltage dividing resistor 388 and lead 346. Potentiometer 386 is connected via a voltage dividing resistor 390 to ground conductor 352.

The base of a PNP transistor 394 is connected between the potentiometer 386 and resistor 390. The emitter of transistor 394 is connected via an emitter resistor 396, voltage dividing resistor 388 and lead 346 to the power supply 348.

The collector of transistor 394 is connected via a collector resistor 398 to ground conductor 352. An emitter bypass capacitor 400 is connected between the emitter of transistor 394 and ground conductor 352 for conducting A.C. signals to ground.

The base of a PNP transistor 406 is directly connected to the collector of transistor 394. The emitter of transistor 406 is connected via an emitter resistor 408 and a lead 410 to the power supply 348. The collector of transistor 406 is connected via collector resistor 412 to the ground conductor 352. An emitter bypass capacitor 414 is connected between the emitter of transistor 406 and ground conductor 352. Transistors 356, 370, 394 are various stages of amplification while transistor 406 produces a square wave output pulse of a predetermined level independent of the magnitude of the input pulse applied to transistor 356.

A coupling network 416, comprising a resistor 418 and a capacitor 420, connects the base of an NPN transistor 422 to the collector of transistor 406. Transistor 422 is connected as an emitter follower to drive a demodulator transformer 432 to isolate the amplifier and pulse shaper 306 from the demodulator 308. The collector of transistor 422 is connected via a lead 424 to the power supply 348. The emitter of transistor 422 is connected to one end of primary winding 430 of a demodulator transformer 432. The other end of the primary winding 430 is connected to ground conductor 352. A secondary winding 434 of demodulator transformer 432 is coupled to a phase sensing diode array 436 comprising diodes 440, 442, 444 and 446. The diodes 440, 442, 444 and 446 are connected in series circuit relationship with the cathode of one diode connected to the anode of the other diode.

Any voltage appearing on secondary winding 434 is applied by leads 448 and 450 to the phase sensing diodes 436. Lead 448 is connected between diodes 440 and 442 and lead 450 is connected between diodes 444 and 446. A secondary winding 434, which is wound on the core of a power supply transformer 456, has a center tap 452 and is connected to ground conductor 352 via conductor 454. A second secondary winding 460 of the power supply transformer 456 is used to produce a second voltage for the diode array 436. A plurality of diodes 467 are connected between leads 462 and 464, which leads are each connected to secondary winding 460 via resistors 465 and 466, respectively. Secondary winding 460 is center tapped and provides a reference voltage in the form of a square wave, due to the clamping of diodes 467, which voltage is applied to phase sensing diode array 436.

Leads 468 and 470 connect the driving coil 332 of chopper 330 across secondary winding 460.

The center tap of secondary winding 460 is connected via a limiting resistor 472 to an output terminal 474. A conductor 476 is connected between ground conductor 352 and an output terminal 478. A capacitor 480 is connected between resistor 472 and output terminal 474 and conductor 476. Gating signals from the demodulator 308 appear between terminals 474 and 478 on output 310.

The polarity sensing means 312 comprises a resistor 481 and a diode 482. Diode 482 has its anode connected via resistor 481 to output terminal 474 and its cathode directly connected to output terminal 478. The anode of diode 482 is also connected to output terminal 484 and the cathode of diode 482 is also connected to output terminal 486. Conductor 58, from the difference modulator 12 to the sample and hold circuit 16, is connected to terminal 484. The polarity sensing means 312 will only permit negative gating signals or a selected gating signal to be applied to conductor 58. Gating signals of a positive polarity will be conducted to ground due to the clamping action of diode 482.

In one embodiment of the difference modulator, the various components could have the following typical values.

| Component: | Value |
|---|---|
| Transformer 320 | 1:3 step-up ratio, input voltage 0–1 mv., shielded windings. |
| Chopper 330 | 6 volt, synchronous 60 cycle mechanical movement, contacts make before break. |
| Resistor 340 | 39KΩ. |
| Resistor 342 | 4.7KΩ. |
| Resistor 344 | 47KΩ. |
| Power supply voltage 348 | 35 volts D.C |
| Capacitor 350 | 39µf. |
| Capacitor 354 | 20µf. |
| Transistor 356 | 2N426. |
| Resistor 360 | 270KΩ. |
| Resistor 364 | 8.2KΩ. |
| Capacitor 366 | 39µf. |
| Capacitor 368 | 20µf. |
| Transistor 370 | 2N426. |
| Resistor 372 | 100KΩ. |
| Resistor 374 | 27KΩ. |
| Resistor 376 | 56KΩ. |
| Resistor 378 | 8.2KΩ. |
| Capacitor 380 | 100µf. |
| Capacitor 384 | 39µf. |
| Potentiometer 386 | 35KΩ pot. |
| Resistor 388 | 22KΩ. |
| Resistor 390 | 33KΩ. |
| Transistor 394 | 2N426. |
| Resistor 396 | 18KΩ. |
| Resistor 398 | 12KΩ. |
| Capacitor 400 | 100µf. |
| Transistor 406 | 2N1377. |
| Resistor 408 | 10KΩ. |
| Resistor 412 | 10KΩ. |
| Capacitor 414 | 250µf. |
| Resistor 418 | 8.2KΩ. |
| Capacitor 420 | 39µf. |
| Transistor 422 | 2N708. |
| Transformer 432 | 3:1 ratio, 15 volt primary. |
| Diodes 440, 442, 444, 446 | 1N903. |
| Resistor 465 | 270Ω. |
| Resistor 466 | 270Ω. |
| Diodes 467 | 1N903. |
| Resistor 472 | 5.6KΩ. |
| Capacitor 480 | .82µf. |
| Resistor 481 | 5.6KΩ. |
| Diode 482 | 1N903. |

In operation, the modulator 300 produces a modulated difference signal. The magnitude of the modulated difference signal is determined by magnitude of the voltage difference between the comparison voltage on conductor 56 and the unknown voltage on input 14. The current flows in one direction in one-half of the primary winding 322 during one-half of the chopper cycle and in the other direction in the other one-half of the primary winding during the other half of the chopper cycle. However, if the comparison voltage applied by conductor 56 is greater than the unknown voltage applied at input 14, the current flow in the primary and secondary windings 322 and 324 will change in phase.

A waveform of the voltage appearing across secondary winding 324 between leads 334 and 336 is illustrated in FIGURE 7. Chopper 330 applies the comparison voltage via contact 326 to one-half of primary winding 322. If the comparison voltage is less than the unknown voltage, the voltage across secondary winding 324 is represented by the first full cycle of the waveform of FIGURE 7. However, if during the first half of the second cycle (when chopper 330 is applying the comparison voltage to contact 326) the comparison voltage on conductor 56 is replaced with a comparison voltage which is greater than the unknown voltage, the voltage appearing across winding 324 will change phase. Thus, the relationship between the comparison voltage and the unknown voltage determines the phase of the voltage appearing across secondary winding 324. In either case, the voltage waveform is a square wave having a moderate amount of noise.

Lead 334 has a pre-established voltage applied thereon depending on the values of voltage dividing resistors 340 and 342 and the voltage of the power supply 348. Thus, any voltage appearing on lead 336 algebraically is added to or subtracted from the voltage established on lead 334.

The modulated difference signal produced by the transformer 320 is applied by coupling capacitor 354 to the base of transistor 356. The waveform designated as 490 illustrates the voltage for one cycle without a change of phase. Transistor 356 amplifies the modulated difference signal and applies the same via coupling capacitor 366 to the second transistor 370. The output of transistor 370 is illustrated by the waveform 492. The amplified difference signal is applied through coupling capacitor 384 and potentiometer 386 to transistor 394. The output of transistor 394 is directly applied to the base of transistor 406. Transistor 406 is driven abruptly from cut off to saturation in response to the output of transistor 394 to produce a square wave signal depicted by waveform 494. The square wave signal from transistor 406 is applied via coupling network 416 to the base of transistor 422.

The square wave output of transistor 422 is applied to the primary winding 430 of demodulating transformer 432. The resulting square wave signal appearing across secondary winding 434 is applied via leads 448 and 450 to the phase sensing diode array 436. Concomitantly, secondary winding 460 applies a voltage to leads 462 and 464, which voltage is clamped at a predetermined level by diodes 467 to produce a second square wave or reference voltage between leads 462 and 464. Leads 462 and 464 apply the square wave reference voltage to the phase sensing diode array 436. If lead 448 is at a higher potential than lead 450, and if lead 462 is at a higher potential than lead 464, the amplified modulated difference signal will be in phase with the square wave reference voltage. When this occurs, diode 446 becomes forwardly biased and conducts producing a negative going signal at output terminals 474 and 478. Diode 446 of the polarity sensing means 312 becomes backwardly biased allowing the negative signal appearing between terminals 484 and 486 to be applied to conductor 58.

In the embodiment of FIGURE 2, the difference modulator 12 would produce a selected gating signal only when the reference voltage was greater than the unknown voltage. Thus, a negative pulse appearing between terminals 484 and 486 would be applied to the AND gates 120 through 138 to reset the flip flops 100 through 118.

If the same input voltage conditions are maintained during the alternate half cycle, the output pulse will remain the same polarity. Alternately, the square wave applied to demodulating transformer 432 could initially be out of phase with the square wave reference voltage without affecting the operation of the circuit.

However, if a different comparison voltage which is less than the unknown voltage is applied to conductor 56, the polarity of the signal appearing across secondary winding 324 of the input transformer 320 changes phase. The amplifier and pulse shaper 306 is responsive to the phase change to apply a modulated square wave signal having a reversed polarity to the primary winding 430 of transformer 432. This change in phase causes a change in the direction of current within the phase sensing diode array 436 to produce a positive going output signal across output terminals 474 and 478. The diode 482 of the polarity sensing means 312 is forwardly biased and conductive to clamp output terminal 484 to output terminal 486. The clamping action of diode 482 prevents a positive going gating signal from being applied to conductor 58 and subsequently to any of the AND gates 120 through 138 of FIGURE 2.

In summary, amplifier and pulse shaper 306 is a phase sensitive amplifier and the polarity of the output signal is dependent on the relationship between the reference voltage and the unknown voltage. If the reference voltage equals the unknown voltage, the modulated difference signal applied to the amplifier and pulse shaper 306 is zero. Such a condition would indicate a balance and no gating signals would appear from either the synchronous demodulator 308 or polarity sensing means 312. By use of the polarity sensing means 312, a negative going selected gating signal will be produced *only* when a comparison voltage is greater than the unknown voltage. It is understood that AND gates are selected which are responsive to a negative going selected gating signal having a predetermined magnitude. Under such criteria, if the the comparison voltage is substantially equal to the unknown voltage, any small gating signals produced by the synchronous demodulator 308 would be of an insufficient magnitude to condition an AND gate.

FIGURE 8 is a partial schematic diagram and partial block diagram illustrating a digital voltage measuring device employing a sample and hold circuit which operates in the parallel mode. Drum 500 stores binary coded sets of programming signals in the programming sequence. Each signal set corresponds to a known digital representation of a comparison voltage. Digital potentiometer 518 is employed to produce comparison voltages and includes a plurality of voltage producing means (schematically shown as resistors) each of which produces an incremental voltage having a known digital representation. Switches R1 and R2 provide means for combining the incremental voltages as a comparison voltage. The encoded drum 500 and photodiodes 502, via amplifiers designated generally as 504, produce digital representations wherein each binary digit level is conditioned by each digital representation beginning at zero until a comparison voltage is produced which equals the unknown input voltage. The encoded drum 500 contains binary digits in the same coded format as illustrated in FIGURE 4, except for the addition of a reset track. A reset photodiode 506 is responsive to the reset track on the encoded drum 500 and the reset signal is amplified by amplifier 508 and applied to the sample and hold circuit at the end of the comparison cycle.

Photodiodes 502 are connected, via amplifiers 504, to a first group of AND gates 510 and to a second group of AND gates 512 through a group of inverters 514. Each AND gate 510 and each AND gate 512 conditions the set and reset inputs respectively of a group of flip flops 516. Each flip flop, when set, energizes a relay actuating coil, designated generally as R/2, which opens and closes contacts designated generally as R1 and R2 located within a constant load potentiometer 518.

A difference modulator 520 receives the comparison voltage from the constant load potentiometer 518 via input 522 and the unknown voltage via input 524. The difference modulator 520 continually produces a gating signal until the reference voltage is equal to the unknown voltage. The gating signal is applied via lead 526 as a second input to each AND gate 510 and 512. An inverter 528 also receives the gating signal and conditions a group of AND gate 530 of the output device.

A plurality of EXCL OR gates 532 are directly connected to each of the photodiode devices 502 via amplifiers 504 and to the outputs of the flip flops 516 to provide second means for comparing the content of the means for selectively storing with the coded sets of programming signals. Additionally, the inputs of each of the EXCL OR gates 532 are applied as inputs to the group of AND gates 530. Gates 530 serve as readout means responsive to the output of the second means for comparing for providing a readout of the content of the means for selectively storing. The outputs from the EXCL OR gates 532 are applied to a NOR gate 534. The output of NOR gate 534 conditions one of two inputs of an AND gate 536, the other input of AND gate 536 being connected to inverter 528. The outputs 540 from each AND gate 530 in combination provide a digital representation of the unknown input voltage when the difference modulator 520 terminates the gating signal indicating balance. Termination of the gating signal by the difference modulator 520 causes inverter 528 to simultaneously condition the AND gates 530.

After the difference modulator 520 indicates balance, the flip flops 516 remain set causing the outputs of the group of AND gates 530 to display the digital representation appearing thereon until reset photodiode device 506 is conditioned by the reset track on the encoded drum 500. When photodiode 506 is activated, it applies a reset pulse via amplifier 508 which resets each of the flip flops 516. After reset, the encoded drum 500 is at zero and the digital voltage measuring device begins a new comparison cycle.

FIGURE 9 illustrates an alternate embodiment of a digital voltage measuring device employing a bidirectional stepping indicator 542. Control of the bidirectional stepping indicator 542 is based upon the same principle of operation as that of FIGURE 8. However, an encoded drum 544 must contain two scales of digital representations designated generally as tracks 546; one scale from zero to maximum numerical count (1023 decimal) is known as the up-scale, and a second scale from maximum numerical count down to zero is known as the down-scale. Additionally, the drum must contain a clock pulse track designated as 548, an up-scale track designated generally as 550 and a down-scale track designated generally as 552. Drum 544 thus serves as a programming means for producing an up-scale sequence of programming signal sets, an up-scale timing signal, a down-scale sequence of programming signal sets, and a down-scale timing signal, each said set comprising a plurality of binary signals, each sequence including a set of every combination of said plurality of binary signals and said sets arranged in said up-scale sequence in ascending order and in said down-scale sequence in descending order.

Photodiodes 502, which respond to the digital representation 546, the AND gates 510 and 512, the inverters 514, the flip flops 516, the relay coils R/2, the EXCL OR gates 532 and the NOR gate 534 are logically connected in an arrangement similar to that for the embodiment illustrated in FIGURE 8. EXCL OR gates 532 act as a coincidence circuit for producing a storage alteration signal when the output signal of storage means 516 and a set of programming signals from programming means 544 coincide. AND gate 510 and 512 provide means for controlling storage of programming signal sets in storage means 516. A clock pulse photodiode 554 via its amplifier 556 produces clock pulses in response to the clock pulse track 548. Similarly, an up-scale photodiode 558 via its associated amplifier 560 and down-scale photodiode 562 via its associated amplifier 564 produce up-scale pulses and down-scale pulses respectively in response to up-scale track 550 and down-scale track 552 respectively.

However, it is necessary to employ different logic to operate the bidirectional stepping indicator 542 between a previously balanced condition and a new balance condition. The input 522, designated in this embodiment as the measured variable representing the unknown voltage, and the reference voltage from potentiometer 518 are both applied as inputs to difference modulator 520.

The difference modulator 520 produces gating signals, first and second control signals on two separate channels 568 and 570. The difference modulator of FIGURE 6 can easily be modified to produce such gating signals by the addition of a positive polarity sensing means to the output of the demodulator 308. The first channel 568 produces a gating signal, a first control signal only when the reference voltage is greater than the unknown voltage while the second channel 570 produces a gating signal, a second control signal only when the reference voltage is less than the unknown voltage. However, channel 568 is connected to a polarity inverter 572 so that the gating signal subsequently appearing on channel 568 is the same polarity as the gating signal on channel 570. During operation, a gating signal will appear either on channel 568 or 570 until a comparison voltage is produced which equals the unknown voltage.

The channels 568 and 570 are connected to a clocked trigger circuit 574. Additionally, the clock pulse photodiode 554 via its amplifier 556 applies clock pulses to the clocked trigger circuit 574. Clocked trigger circuit 574, upon receiving a gating signal from either channel 568 or 570 and a clock pulse from clock pulse track 548, produces a trigger pulse on either of its outputs 578 or 580 respectively. Output 578 is connected to one input of a three-input AND gate 582 and output 580 is connected to one input of a three-input AND gate 584. The other two inputs to AND gates 582 and 584 are obtained from a NOR gate 534 (same as FIGURE 8) and a scale flip flop 586, the origin of which will now be described.

The encoded drum 544 contains the coded digital representations 546 thereon. The digital representation 546 conditions the photodiodes 502 in accordance with the particular digital representation positioned adjacent the photodiodes. Also for each digital representation, clock pulse photodiode 554 will be actuated. Additionally, either the up-scale photodiode 558 or the down-scale photodiode 562 will be actuated to control the state of a scale flip flop 586. If the drum 544 is on an up-scale, photodiode 558 via amplifier 560 sets flip flop 586. Conversely, if the drum 544 is on a down-scale, photodiode 562 via amplifier 564 resets flip flop 586. When flip flop 586 is set, only the second input to AND gate 582 is enabled or conditioned. Similarly, when flip flop 586 is reset, only the second input to AND gate 584 is enabled or conditioned.

The photodiodes 502 via amplifiers 504 condition AND gate 512 via inverters 514, AND gates 510 and EXCL OR gates 532. AND gates 510 and 512 control the states of flip flops 516 and energizing of relay actuating coils R/2. The flip flops 516 simultaneously condition EXCL OR gates 532. EXCL OR gates 532 condition NOR gate 534, and the output of NOR gate 534 is applied simultaneously as the third input of both AND gates 582 and 584.

Referring again to AND gates 510 and 512, control of the states of flip flops 516 in response to AND gates 510 and 512 is under direct control of an AND gate 590. An EXCL OR gate 594 is responsive to the gating signals on channels 568 and 570 and conditions one input of AND gate 590 when gating signals are produced by the difference modulator 520. The other input to AND gate 590 emanates from a one-shot multivibrator 592. The one-shot multivibrator 592 has an "on time" or retains a signal which conditions AND gate 590 for a time slightly greater than the time required for the encoded drum 544 to advance from one digital representation to an adjacent digital representation.

Thus, AND gates 582 and 584 are, respectively, increment and decrement gates and receive inputs from NOR gate 534, clocked trigger circuit 574 and scale flip flop 586. NOR gate 534 is utilized to lock flip flops 516 in various steps until each EXCL OR gate 532 is conditioned. When this occurs, the flip flops 516 and the encoded drum 544 simultaneously condition each EXCL OR gate 532 causing NOR gate 534 to condition each AND gate 582 and 584.

After each digital representation, the flip flops 516 are reset by the drum separation between adjacent digital representations. The AND gates 512 are conditioned by the AND gates 590 during the interval between digital representations. AND gate 590 is conditioned by the multivibrator 592 and the EXCL OR gate 594. Gate 594 produces an inequality signal in response to either said first or said second control signal and AND gate 590 produces a gating signal in response to simultaneously receiving said inequality signal and said storage alteration signal. The gating signal is applied to one input of each of AND gates 510 and 512 which each have their other input adapted to receive one bit of a set of said programming signals.

Considering now the operation of the AND gates 582 and 584 which control the bidirectional stepping device 542, the output of AND gate 582 is directly connected to an up scale driver 596 which drives the bidirectional stepping indicator 542 in an up direction. The output of AND gate 584 is connected to a down scale driver 598 which drives the bidirectional stepping indicator 542 in a down direction.

Each AND gate 582 and 584 is also connected to an EXCL OR gate 600. EXCL OR gate 600 is directly connected to and controls the one-shot multivibrator 592.

In operation, the flip flops 516 are in various states at the end of a comparison cycle. When a new comparison cycle is initiated, the flip flops 516 remain locked in their various states until the encoded drum 544 reaches a digital representation equalling the various states of the flip flops 516. If the bidirectional stepping indicator 542 is to be stepped in an up direction from the previous balance, then the flip flops 516 remain locked until the encoded drum 544 positions the appropriate digital representation on the up scale adjacent photodiodes 502. Similarly, if the indicator 542 is to be stepped down, the flip flops 516 remain locked until the encoded drum 544 positions the appropriate digital representation on the down scale adjacent the photodiodes 502. When the appropriate digital representation on the appropriate scale is positioned adjacent the photodiodes 502, all the flip flops 561 are simultaneously unlocked and reset. Thereafter, the flip flops 516 are responsive to the digital representation on the encoded drum 544 and are reset between digital representations until a digital representation of the unknown voltage is produced. As the flip flops 516 are set and reset, the constant load potentiometer 518 is concurrently adjusted by relay actuating coils R/2 and contacts R1 and R2 to produce a comparison voltage which equals the unknown voltage. The difference modulator 520 receives each comparison voltage and conditions the clocked trigger circuit 574 with an appropriate gating signal. The clocked trigger circuit 574, the NOR gate 534 and flip flop 586 condition AND gates 582 and 584. AND gates 582 and 584 control the stepping of the bidirectional stepping indicator 542 via the scale drivers 596 and 598.

When a comparison voltage is produced by the constant load potentiometer 518 which equals the unknown voltage, the difference modulator 520 terminates its gating signals. The indication of the bidirectional stepping indicator 542, when the comparison voltage equals the unknown voltage, represents the unknown voltage. EXCL OR gate 594 immediately disables AND gate 590 thereby preventing any signal from the photodiodes 502 via amplifiers 504 from being applied to the flip flops 516. Flip flops 516 are subsequently locked in their respective states until a new comparison cycle is initiated and until the encoded drum 544 reaches a digital representation equalling the various states of flip flops 516.

What is claimed is:

1. A digital voltage measuring device for converting an unknown voltage into a digital representation comprising
   (a) a digital potentiometer including a plurality of voltage producing means each of which produces an incremental voltage having a known digital representation and including means for combining said incremental voltages to provide a comparison voltage;
   (b) a difference means for comparing said comparison voltage and the unknown voltage to each other and for producing a modulated difference signal when said comparison voltage is unequal to said unknown voltage, said difference means including
      (1) means for amplifying said modulated difference signal, and
      (2) means for producing a gating signal in response to said amplified modulated difference signal;
   (c) means for producing binary coded sets of programming signals in accordance with a programmed sequence, each of said sets corresponding to the known binary representation of a combination of said incremental voltages;
   (d) means for selectively storing a set of said programming signals in response to said gating signal and for passing said programming signals as a bit-parallel digital output; and
   (e) means for applying said bit-parallel output signals to said incremental voltage producing means for controlling said means for combining said incremental voltages,
   (f) second means for comparing the content of the means for selectively storing with the coded sets of programming signals,
   (g) and readout means responsive to the output of the second means for comparing for providing a readout of the content of the means for selectively storing, said sets of programming signals and said gating signal being operative upon said storing means until said comparison voltage substantially equals said unknown voltage.

2. The digital voltage measuring device of claim 1 wherein said selective storage means is a sample and hold circuit.

3. The digital voltage measuring device of claim 2 wherein said difference means produces a modulated difference signal having a phase relationship which is dependent on an unequal comparison voltage either exceeding or being less than said unknown voltage, said sample and hold circuit including:
   (1) a plurality of bistable devices electrically coupled to said digital potentiometer means for storing a set of said programming signals and to continuously pass the stored signals as said bit-parallel output to said digital potentiometer, and
   (2) a plurality of gating devices electrically coupled to said bistable devices such that at least one of said gating devices is associated with one of said bistable devices, said gating devices being such that when a comparison voltage is unequal to an unknown voltage, said gating devices receive simultaneously another set of said programming signals and said gating signal from said difference means to store said another set of programming signals in said bistable devices.

4. The digital voltage measuring device of claim 3 wherein said difference means further includes:
   (3) means for synchronously demodulating said amplified modulated difference signal to produce a demodulated signal having a first polarity which indicates the relationship between an unequal comparison voltage and said unknown voltage and a second polarity which indicates that a comparison voltage and said unknown voltage are substantially equal and wherein said gating signal producing means includes
      (i) polarity sensing means electrically coupled to said demodulating means for determining the polarity of said demodulated signal, said polarity sensing means being operative to produce said gating signal when said demodulated signal is of a polarity which indicates said unequal comparison voltage is greater than said unknown voltage.

5. The digital voltage measuring device of claim 4 comprising in addition
   (f) an output stage for providing a binary coded representation of said unknown voltage, said stage coupled to said sample and hold circuit to pass the binary representation stored in said sample and hold circuit as an output signal in response to said second polarity demodulated signal indicating that a comparison voltage and said unknown voltage are substantially equal.

6. A digital voltage measuring device for converting an unknown voltage into a digital representation comprising:
   (a) a programming means for producing an up-scale sequence of programming signal sets, an up-scale timing signal, a down-scale sequence of programming signal sets, and a down-scale timing signal, each said set comprising a plurality of binary signals, each sequence including a set of every combination of said plurality of binary signals and said sets arranged in said up-scale sequence in ascending order and in said down-scale sequence in descending order;
   (b) means for storing a set of said programming signals and for providing a bit-parallel binary output corresponding to the binary representation of said signal set;
   (c) a digital potentiometer for providing a comparison voltage as an output in response to said bit-parallel output, said potentiometer including a plurality of voltage producing means each of which is responsive to a bit of said bit-parallel output to produce an incremental voltage having a known digital representation and including means for combining said incremental voltages to provide said comparison voltage;
   (d) means for comparing said comparison voltage and an unknown voltage and for producing a modulated difference signal when said comparison and said unknown voltage are unequal;
   (e) a coincidence circuit for producing a storage alteration signal when said storage means output signals and said programming signals coincide; and
   (f) means for controlling storage of said programming signal sets in said storage means, said storage control means responsive to simultaneously receiving said modulated difference signal and said storage alteration signal to store another of said programming signal sets in said storage means.

7. The voltage measuring device of claim 6 wherein said modulated difference signal is phase modulated and wherein said difference signal has a first phase when said unknown voltage exceeds said comparison voltage and a second phase when said unknown voltage is less than said comparison voltage, and said comparison means further includes:
  (1) means for synchronously demodulating said modulated difference signal to produce an amplitude modulated signal which indicates the relationship between an unequal comparison voltage and said unknown voltage; and
  (2) polarity sensing means for producing a first control signal when said unknown voltage is greater than a comparison voltage and for producing a second control signal when said unknown voltage is less than a comparison voltage; and wherein said storage means comprises:
    (1) a plurality of bistable devices, each device adapted to store and provide as an output one bit of said programming signal set; and wherein said storage control means comprises:
      (1) means for producing an inequality output signal in response to said first control signal and in response to said second control signal;
      (2) means for producing a gating signal in response to simultaneously receiving said inequality output signal and said storage alteration signal, and
      (3) a plurality of gates, each of said gates associated with one of said bistable devices and each adapted to pass one bit of a programming signal set upon simultaneous receipt of said bit and said gating signal whereby a signal set is stored in said storage means each time said gate signal producing means produces a gating signal.

8. The voltage measuring device of claim 7 wherein said means for producing a gating signal further includes
  (i) a bidirectional stepper circuit for controlling production of said gating signal, said stepper circuit responsive to simultaneously receiving said up-scale timing signal, said first control signal and said coincidence signal to produce said gating signal to store a new set of programming signals, said new set having a binary representation one greater than the set previously stored and said stepper circuit responsive to simultaneously receiving said down-scale timing signal, said second control signal and said coincidence signal to produce a gating signal to store another programming signal set, said another signal set having a binary representation one less than the set previously stored.

9. The voltage measuring device of claim 8 wherein said bidirectional stepper circuit comprises:
  (1) an increment gate responsive to simultaneously receiving said first control signal, said up-scale timing signal and said coincidence signal to produce a storage count advance signal; and
  (2) a decrement gate responsive to simultaneously receiving said second control signal, said down-scale timing signal and said coincidence signal to produce a storage count decrease signal; and wherein said means for producing a gating signal is responsive to simultaneously receiving said inequality output signal and said storage count advance signal to produce said gating signal thereby storing a new programming signal set in said storage means and is responsive to simultaneously receiving said inequality signal and said storage count decrease signal to produce said gating signal thereby storing another programming signal set in said storage means.

10. The voltage measuring device of claim 9 further comprising:
  (g) a bidirectional stepping indicator for displaying a digital representation of the comparison voltage, said indicator responsive to said storage count advance signal to advance the displayed digital representation and responsive to said storage count decrease signal to decrease the displayed digital representation.

11. The voltage measuring device of claim 9 wherein said programming means comprises:
  (1) a rotatable encoded drum having a surface periphery of varying optical densities representing binary coded digits in the form of a plurality of digital representations; and
  (2) means including a light source and photosensitive devices operatively coupled to said drum for converting said binary coded digits into said programming signal sets and said up-scale and down-scale timing track signals; and wherein said digital potentiometer means includes a matrix comprising a plurality of reed relays and resistors connected as a constant load potentiometer to produce said comparison voltages.

12. The digital voltage measuring device of claim 3 wherein said gating devices are AND gates.

13. The digital voltage measuring device of claim 5 wherein said memory means includes:
  (i) a rotatable encoded drum having a surface periphery of varying optical densities representing binary coded digits in the form of a plurality of digital representations; and
  (ii) means including a light source and photosensitive devices operatively coupled to said drum for converting said binary coded digits into said programming signal sets; said digital potentiometer means includes a matrix comprising a plurality of reed relays and resistors connected as a constant load potentiometer to produce said comparison voltages.

References Cited

UNITED STATES PATENTS

| | | | |
|---|---|---|---|
| 2,497,961 | 2/1950 | Shaw | 324—99 XR |
| 2,625,822 | 1/1953 | Nichols | 324—99 |
| 2,775,754 | 12/1956 | Sink | 324—99 XR |
| 2,836,356 | 5/1958 | Forrest et al. | 324—99 XR |
| 2,896,198 | 7/1959 | Bennett | 324—99 XR |
| 2,901,685 | 8/1959 | Alder | 324—99 XR |
| 2,920,316 | 1/1960 | Cohen | 340—347 |
| 2,940,071 | 6/1960 | Kindred | 324—99 XR |
| 3,153,193 | 10/1964 | Caldwell | 324—99 |
| 3,167,757 | 1/1965 | D'Aquila | 340—347 |
| 3,187,318 | 6/1965 | Chapman | 340—347 XR |

RUDOLPH V. ROLINEC, Primary Examiner
ERNEST F. KARLSEN, Assistant Examiner

U.S. Cl. X.R.
340—347

PO-1050
(5/69)

UNITED STATES PATENT OFFICE
CERTIFICATE OF CORRECTION

Patent No. 3,483,468                    Dated   December 9, 1969

Inventor(s)  Gerard H. Gaynor

It is certified that error appears in the above-identified patent and that said Letters Patent are hereby corrected as shown below:

Column 18, delete line 55; and in line 59, "561" should read -- 516 --;

Signed and sealed this 27th day of April 1971.

(SEAL)
Attest:

EDWARD M. FLETCHER, JR.                WILLIAM E. SCHUYLER, JR.
Attesting Officer                       Commissioner of Patents